United States Patent

Cretella et al.

(10) Patent No.: US 6,862,499 B1
(45) Date of Patent: Mar. 1, 2005

(54) ENVIRONMENT-CONTROLLED TRANSPORT UNIT

(75) Inventors: Joaquim Geraldo Cretella, Shoreview, MN (US); Doyle G. Herrig, Elko, MN (US); Leslie D. Rustad, Burnsville, MN (US); Randal Gast, Chaska, MN (US); Richard W. Schmidt, Plymouth, MN (US); Thomas A. Flanagan, St. Louis Park, MN (US)

(73) Assignee: Thermo King Corporation, Minneapolis, MN (US)

( * ) Notice: Subject to any disclaimer, the term of this patent is extended or adjusted under 35 U.S.C. 154(b) by 693 days.

(21) Appl. No.: 09/659,500

(22) Filed: Sep. 11, 2000

Related U.S. Application Data

(60) Provisional application No. 60/218,423, filed on Jul. 14, 2000.

(51) Int. Cl.[7] .............................................. G05D 23/00
(52) U.S. Cl. ....................................... 700/299; 700/276
(58) Field of Search ................................. 700/299, 276, 700/292; 62/239; 236/44 R, 61, 91 C, 1 B, 1 C, 91 D; 702/175, 174

(56) References Cited

U.S. PATENT DOCUMENTS

| | | | |
|---|---|---|---|
| 4,234,926 A | * | 11/1980 | Wallace et al. ............. 702/188 |
| 4,663,725 A | | 5/1987 | Truckenbrod et al. |
| 4,903,498 A | | 2/1990 | Hanson |
| 4,918,932 A | | 4/1990 | Gustafson et al. |
| 5,161,383 A | | 11/1992 | Hanson et al. |
| 5,181,389 A | | 1/1993 | Hanson et al. |
| 5,197,666 A | | 3/1993 | Wedekind |
| 5,222,368 A | | 6/1993 | Hanson |
| 5,259,198 A | | 11/1993 | Viegas et al. |
| 5,287,705 A | | 2/1994 | Roehrich et al. |
| 5,291,745 A | | 3/1994 | Hanson |
| 5,311,451 A | * | 5/1994 | Barrett ........................ 700/278 |
| 5,320,167 A | | 6/1994 | Johnson et al. |
| 5,325,678 A | | 7/1994 | Borah et al. |
| 5,424,720 A | | 6/1995 | Kirkpatrick |
| 5,447,038 A | | 9/1995 | Vaynberg |
| 5,458,188 A | | 10/1995 | Roehrich et al. |
| 5,791,236 A | | 8/1998 | Schouten |
| 5,892,690 A | * | 4/1999 | Boatman et al. ............. 700/276 |
| 5,904,727 A | * | 5/1999 | Prabhakaran ................ 701/208 |
| 5,950,709 A | | 9/1999 | Krueger et al. |
| 5,983,655 A | | 11/1999 | Kistner et al. |
| 6,007,603 A | | 12/1999 | Garrett |
| 6,167,255 A | * | 12/2000 | Kennedy et al. .......... 455/414.1 |
| 6,421,571 B1 | * | 7/2002 | Spriggs et al. ................. 700/17 |
| 6,512,455 B2 | * | 1/2003 | Finn et al. ................ 340/572.1 |
| 6,611,686 B1 | * | 8/2003 | Smith et al. ................. 340/989 |
| 2002/0038265 A1 | * | 3/2002 | Mertz et al. ................... 705/28 |
| 2002/0065698 A1 | * | 5/2002 | Schick et al. ................... 705/8 |
| 2003/0055666 A1 | * | 3/2003 | Roddy et al. ................... 705/1 |

* cited by examiner

*Primary Examiner*—Jayprakash N. Gandhi
*Assistant Examiner*—Chad Rapp
(74) *Attorney, Agent, or Firm*—Michael Best & Friedrich LLP

(57) ABSTRACT

The invention is directed to regulating the conditioned space of an environment-controlled transport unit by identifying the product being conveyed as cargo in the conditioned space of a transport unit. A user can identify the cargo by selecting it from a menu of cargo identifiers. Once the cargo is identified, an environment control system retrieves from memory environment-control parameters as a function of the identified cargo, and regulates the environment of the conditioned space based upon the environment-control parameters.

26 Claims, 5 Drawing Sheets

ENVIRONMENT-CONTROLLED TRANSPORT UNIT

RELATED APPLICATIONS

This application claims priority from U.S. Provisional Application Ser. No. 60/218,423, filed Jul. 14, 2000.

TECHNICAL FIELD

This invention relates to cargo-carrying transport units, and more particularly to environment-controlled transport units.

BACKGROUND

Every day, cargo is shipped around the country in environment-controlled transport units such as trucks, semi-trailers, railroad cars and other cargo containers. The environment-controlled transport units regulate the environmental conditions, such as the temperature and humidity, of the container's enclosed space, or "conditioned space." Environment-controlled transport units allow many kinds of products to be transported over great distances without spoilage or damage. An environment-adjusting system, such as a refrigeration system, is used to set and regulate the environment of the conditioned space. A control unit governs the environment-adjusting system.

An early control unit was a simple thermostat, which turned a refrigeration system on and off to keep the temperature of a conditioned space close to a desired temperature. A simple thermostat employed only one environment-control parameter, i.e., the desired temperature of the conditioned space, or "set point temperature." An operator simply set the thermostat to the desired set point temperature, and the thermostat controlled the refrigeration system to create and maintain the set point temperature in the conditioned space.

SUMMARY

As environment-controlled transport units have become more widely used, it has become apparent that efficient environment control involves more than simply setting a thermostat to a particular set point temperature. The set point temperature is still an important environment-control parameter, but it is one of several parameters. Other parameters include humidity, light and atmospheric factors. In general, environment-control parameters such as these relate to regulating the conditioned space to meet the needs of the cargo and improving the efficiency of the environment-control process.

In addition, experience has shown that different kinds of cargo are best transported at under different environmental conditions and subject to different environment-control parameters. As the diversity of cargo being conveyed by environment-controlled transport units has increased, and as the number of monitored environmental conditions has increased, it has become more difficult to keep track of which environment-control parameters apply to which kinds of cargo. Setting the control unit with the wrong parameters can result in damage to the cargo.

The invention provides a simplified way to set several environment-control parameters for a particular load of cargo being conveyed in an environment-controlled transport unit. Instead of setting the parameters individually, as with conventional systems, the user identifies the product being carried as cargo to the control unit, and the control unit then automatically determines what environment-control parameters ought to be applied, and then regulates the conditioned space accordingly.

In one aspect, the invention is directed to a method of regulating the conditioned space in an environment-controlled transport unit. In response to an identification of the cargo received from a user, one or more environment-control parameters are retrieved from a database as a function of the identified cargo. The environment inside the environment-controlled transport unit is then regulated based upon the environment-control parameters. One way in which the cargo may be identified is through a menu-driven system, in which the user (such as a truck driver of an environment-controlled truck) simply selects the cargo being transported from a presented menu.

In another aspect, the invention is directed to an environment control system. The system includes an environment-adjusting system configured to adjust the environment of a conditioned space, a controller configured to regulate the operation of the environment-adjusting system, a database comprising kinds of cargo and associated environment-control parameters, and an input device. The controller retrieves the environment-control parameters from the database as a function of a cargo identification received by the input device. The controller regulates the environment-adjusting system based upon the environment-control parameters.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
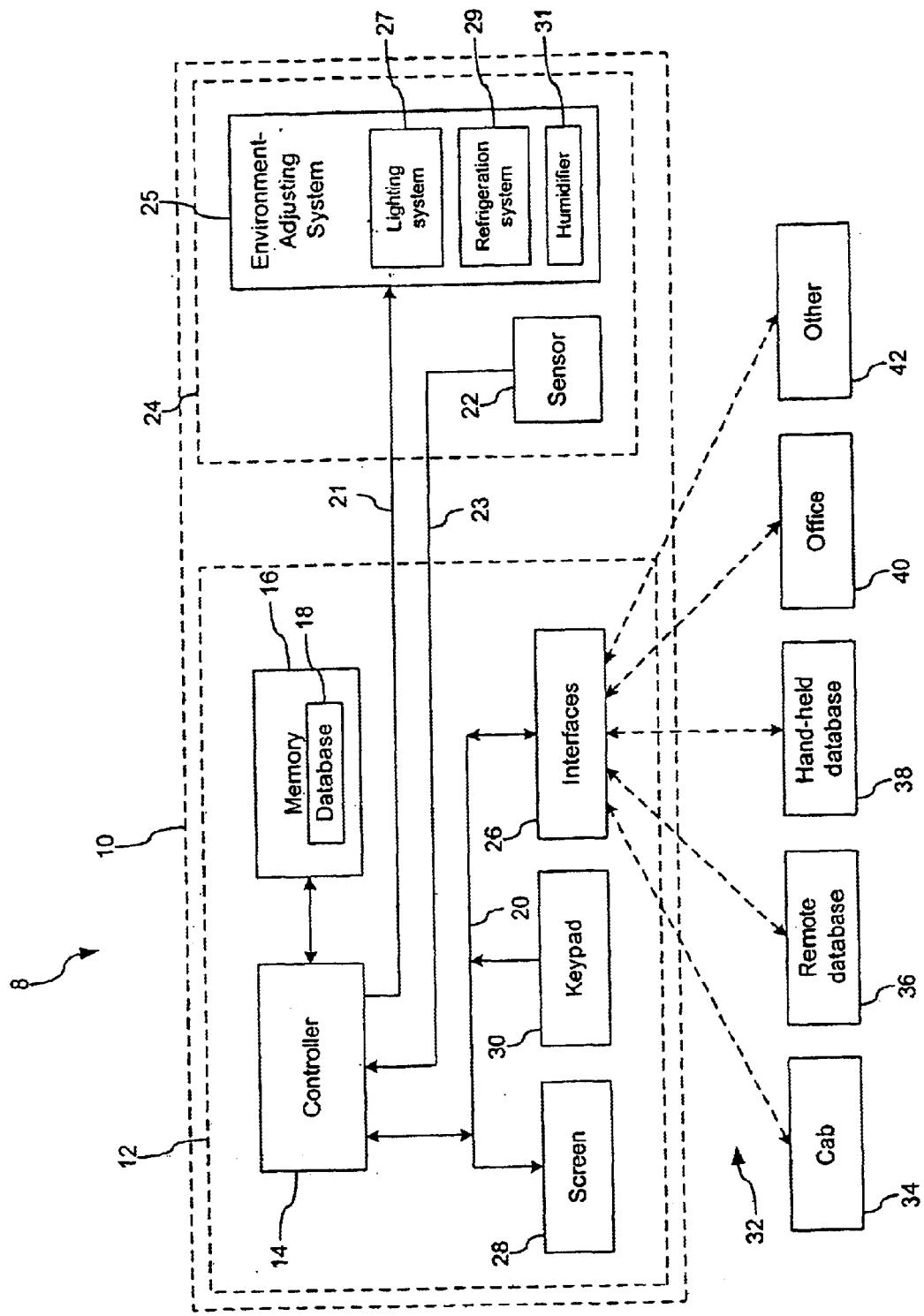
FIG. 1 is a block diagram depicting an environment control system.

FIG. 1 is a block diagram showing a system 8. An environment-controlled transport unit 10 includes control unit 12 and conditioned space regulator 24, which interacts with the conditioned space. Control unit 12 includes controller 14 that regulates an environment-adjusting system 25, in order to regulate the environment of the conditioned space in the environment-controlled transport unit 10. The environment-adjusting system 25 typically includes one or more environment-adjusting subsystems. Subsystems may include a refrigeration system 29 that adjusts the temperature of the conditioned space, a humidifier 31 that regulates the humidity of the conditioned space, and a lighting system 27 that regulates the light in the conditioned space. The subsystems shown in FIG. 1 are exemplary, and an environment-controlled transport unit 10 may include more or fewer subsystems than are shown. Other possible subsystems include a heater, a dehumidifier, an atmosphere regulator and a venting system. Each subsystem of the environment-adjusting system 25 may perform several functions, with each function regulated by the controller 14. For example, the controller 14 typically regulates the refrigeration system's 29 speed of operation (e.g., whether the refrigeration system 29 operates at high speed, low speed or normal speed) and mode of operation (i.e., whether the refrigeration system 29 operates continuously or operates in start-and-stop mode). One or more sensors 22 provides information to the controller 14 about the environmental conditions inside the conditioned space, such as the current temperature and humidity. Sensors 22 thus provides feedback to the controller 14.

The controller 14 is coupled to memory 16 that represents any suitable computer-readable medium that stores computer-executable instructions that may be executed by the controller 14. The instructions may be stored in a machine or computer system on any machine-readable medium such as a magnetic disk or optical drive, or may be stored within non-volatile memory such as read-only memory (ROM). Memory 16 typically includes a database 18, used to store environment-control parameters used by the controller 14 to regulate the environment-adjusting system 25. Within the database 18, the environment-control parameters, such as set point temperature and humidity, are functions of particular products, such as ice cream, apples or soft drinks. Examples of other environment-control parameters are discussed in more detail below.

The sensor 22 and the environment-adjusting system 25 are input/output devices by which the controller 14 interacts with the conditioned space. The controller 14 interacts with a user, such as the driver of an environment-controlled transport unit, by way of input/output devices such as a display screen 28 and a keypad 30. The display screen 28 and keypad 30 may be coupled to the controller 14 via a bus 20. Other input/output devices in addition to those shown in FIG. 1 may be coupled to the controller 14 via the bus 20 in a similar fashion, such as an audible alarm that sounds if the cargo is in danger of being damaged. In FIG. 1, the sensor 22 and the environment-adjusting system 25 are shown coupled to the controller 14 by communication channels 23 and 21, separate from bus 20. Such an arrangement of communication channels is for purposes of illustration, and the sensor 22 and the environment-adjusting system 25 can be coupled to the controller 14 via bus 20 as well.

As will be shown below, the display screen 28 and the keypad 30 allow the user to identify the cargo, and the cargo identification is received by the controller 14. The cargo identification represents the products that will be hauled as cargo and stored in the conditioned space. The user may identify, for example, cargo such as "Potatoes" or "Fish." One way for the user to identify cargo is by making a selection from a menu, as will be described below. After the controller 14 receives the user's cargo identification, the controller retrieves the environment-control parameters as a function of the identified cargo from the database 18, or from a non-resident database as described below. The controller 14 regulates the environment-adjusting system 25, and thereby regulates the conditioned space inside the environment-controlled transport unit, based upon the retrieved parameters.

The control unit 12 may include one or more communication interfaces 26 that allow external communication connections 32. The connections 32 may be wireless, such as by radio frequency signal, infrared signal, satellite link or cellular telephone, or they may be hard-wired electrically or optically, or any combination thereof. By way of the interfaces 26 the control unit 12 can obtain access to a remote database 36, by which the control unit 12 can obtain data concerning thousands of products and their associated environment-control parameters. The information in the remote database 36 may be downloaded in whole or in part to the memory 16 of the control unit 12, to create the unit's own database 18. The unit's database 18 may also be downloaded from a local non-resident source, such as a hand-held device 38 connected to the unit 12 by way of an interface 26. Cargo may be identified on the control unit 12 itself using input/output devices such as the display screen 28 and the keypad 30, or cargo may be identified away from the unit, such as from the cab 34 of the truck or from the shipping office 40. A user may interact with controller 14 via interface 26 using other devices 42 as well, such as a bar code scanner or an optical character recognition scanner.

Figure 2:
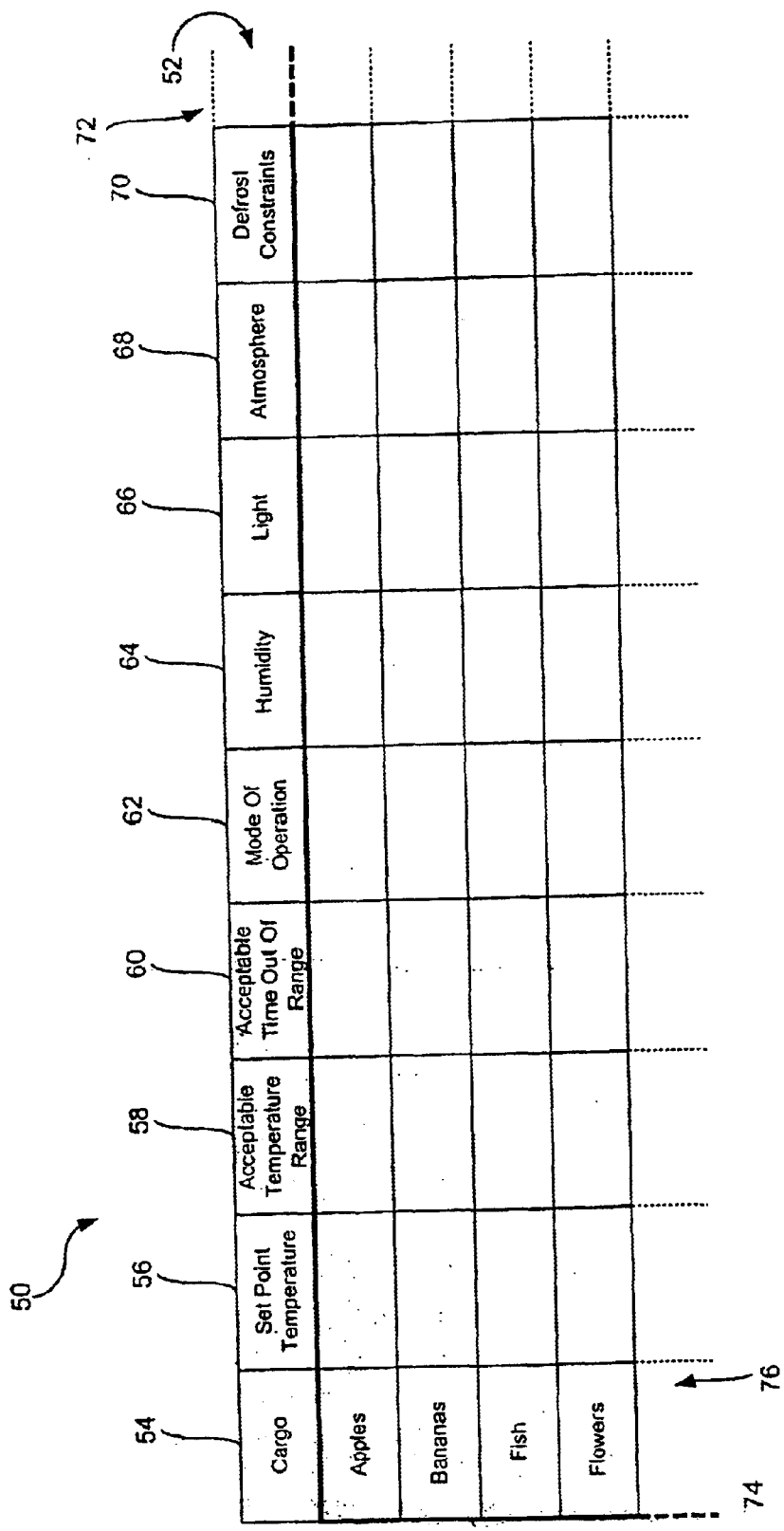
FIG. 2 is an illustrative database in the form of a data table depicting exemplary relationships among cargo products and environment-control parameters.

FIG. 2 illustrates a database 74 containing environment-control parameters 52 as a function of kinds of cargo 54, in the form of a data table 50. Although the data are arranged in FIG. 2 in the form of a data table 50, any method of storing environment-control parameters 52 as a function of cargo 54 can be used, such as a flat file, lookup table, data structure, linked list or data tree. The cargo 54 in the database 74 represent the products that can be hauled as cargo in the environment-controlled transport unit. Four examples of cargo 76 are shown, but any number of cargo types can be included in the database 74. When the user identifies a particular cargo, such as by selection of a cargo option from a menu, the controller 14 finds the identified cargo in the database 74, and finds the parameters that are a function of the cargo identification.

Eight examples of environment-control parameters 52 are shown, but any data for any number of parameters may be included in the database 74. One environment-control parameter is the set point temperature 56, i.e., the desired temperature of the conditioned space. Different kinds of cargo are best shipped at different temperatures. For example, frozen beef may be shipped at 5° F. (−15° C.) while bananas may be shipped at 54° F. (12° C.). Another environment-control parameter is an acceptable temperature range 58, i.e., the acceptable variance from the set point temperature. Some types of cargo, such as oranges, can be shipped at a wide range of temperatures, while other types of cargo, such as bananas, are more sensitive to temperature variations and are best transported in a narrow range of temperatures. A further environment-control parameter is acceptable time-out-of-range 60, which defines the amount of time the cargo can be outside the acceptable temperature range without becoming damaged. Another environment-control parameter concerns optimum mode of operation 62. For some kinds of cargo, especially cargo cooled with a refrigeration system, continuous operation of the refrigeration system is preferred, but for other kinds of cargo, a fuel-conserving start-and-stop operation is acceptable. Some kinds of cargo are better transported in a container with controlled humidity, so environment-control parameters related to humidity 64 may be included. Similarly, some kinds of cargo may use light-control parameters 66, such as a desired light level or desired durations of light and darkness. In some cases it is desirable to regulate atmospheric factors 68, such as a regulated percentage or partial pressure of carbon dioxide, oxygen, ethylene or inert gas.

Some kinds of cargo require no data in database 74 for a particular parameter. For example, light may be an unimportant factor when the cargo is fish, and thus there may be no light-regulation parameter stored in database 70 as a function of the cargo "Fish." Light may be a very important factor when the cargo is flowers, however, and one or more light-regulation parameters may be stored in database 70 as a function of the cargo "Flowers." Similarly, frozen foods that require no special atmospheric control do not require any atmosphere-regulation parameters. Some kinds of fruit, by contrast, can be transported in a low oxygen atmosphere to delay ripening, and the fruit may be associated with one or more atmosphere-regulation parameters.

Some of the parameters, such as the set point temperature 56, may involve a single number. Other parameters, such as lighting 60 and defrosting constraints 70, may involve several pieces of data. Defrosting constraints 70 may entail, for example, different set point temperatures over different durations.

Figure 5:
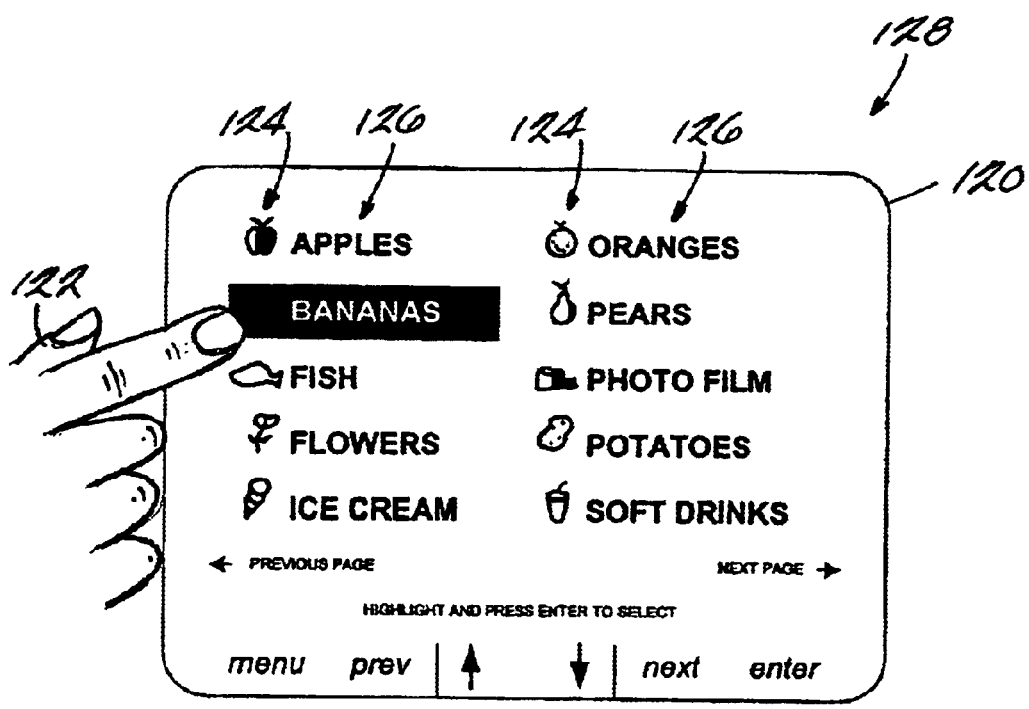
FIG. 5 depicts a display screen for use with an embodiment of the invention.

The environment-control parameters shown in FIG. 2 are not exclusive. Additional data 72 may be stored in the database 74, including further environment-control parameters. Database 74 may also store data associated with the cargo identifications other than environment-control parameters, such as icons 124 as shown in FIG. 5, or foreign language names of the products.

Figure 3:
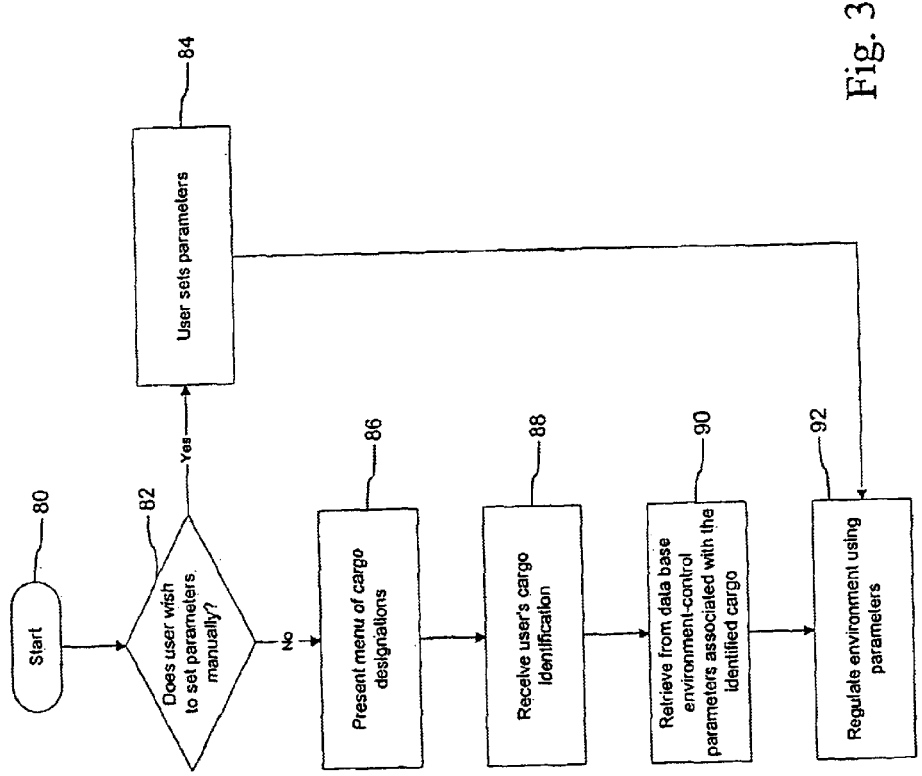
FIG. 3 is a flow chart showing a process consistent with an embodiment of the invention.

Each of the environment-control parameters can be set manually. An advantage of the invention, however, is that manual setting of the parameters can be avoided, as illustrated by FIG. 3. When the user wishes to set environment-control parameters (80), the user may be presented the option of setting the parameters manually (82) and the user may choose to do so (84). In many cases, however, setting the parameters manually is time-consuming. Setting the environment-control parameters manually can also be unreliable, because many users may not know the optimal settings for the cargo being hauled.

The invention offers an alternative to manual setting of the environment-control parameters. The control unit 12 presents the user a menu of cargo options, which typically comprises a list of products that could be cargo (86). The menu may be presented in several formats, as will be discussed below, and may be presented in several ways, such as by a display screen 28. The user scans the menu for the cargo option that represents the cargo inside the conditioned space of the environment-controlled transport unit, and selects the cargo option that represents the cargo. The selection may be made in many ways, such as by entry on the keypad 30. Controller 14 receives the user's cargo identification (88) and retrieves the environment-control parameters as a function of the identified cargo (90) from the database 18. The controller 14 then regulates the environment-adjusting system 25 that affects the environment of the conditioned space in the environment-controlled transport unit (92) according to the retrieved parameters.

The following scenario further illustrates the process. An environment-controlled transport unit such as a refrigerated semi trailer truck is to transport a load of bananas, a cargo which is temperature-sensitive. A user, such as the truck driver, scans a menu of cargo options presented on a display screen 28. By using a keypad 30, the user can scroll through the menu to find the word "Bananas" and can then select the cargo option "Bananas" from the menu. The controller 14 receives the user's cargo identification, searches for "Bananas" in the database 18 and retrieves environment-control parameters related to bananas from the database 18. For example, the controller 14 retrieves information that the optimal set point temperature for bananas is 54° F. (12° C.), with an acceptable temperature range of 52° to 56° F. (11° to 13° C.), along with other environment-control parameters related to bananas. The controller 14 then manages the environment-adjusting system 25 to bring about and maintain the desired environmental conditions for bananas in the conditioned space.

Figure 4:
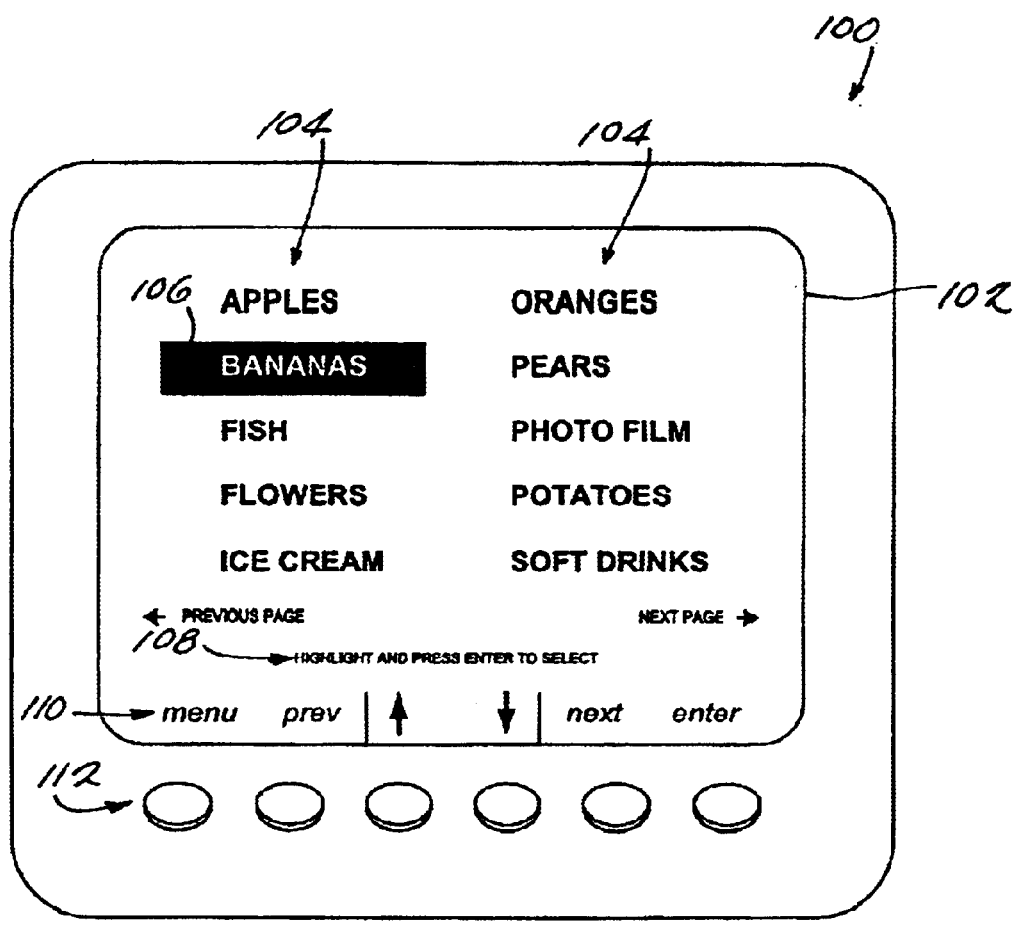
FIG. 4 depicts a display screen and keypad for use with an embodiment of the invention.

FIG. 4 provides an example of an input/output device 100 by which the user may identify to the controller the product being carried as cargo. The input/output device 100 includes a display screen 102. Display screen 102 may be a monochromatic or color display, such as a liquid crystal diode (LCD) display, capable of displaying alphanumeric and graphic data. As shown in FIG. 4, a menu of ten cargo options 104 is displayed. The kinds of cargo may be arranged alphabetically, as shown in FIG. 4. Alternatively, the cargo options may be arranged in any other convenient way, such as by categories of related products (such as "Frozen foods," "Produce," "Non-foods"), with sub-menus for each category. Sub-menus may also be provided for particular products. For example, a user's selection of the cargo option "Apples" may cause a sub-menu to appear showing varieties of apples, such as "Delicious," "McIntosh," or "Granny Smith." The menu and other on-screen information may be presented in any language. For large menus, an index may be presented to allow the user to select the initial letter of a cargo option. On-screen help 108 may be provided. The user may interact with the input/output device 100 by way of a keypad 112. The keys of the keypad 112 correspond to different actions 110 shown on the display 102. By pressing the appropriate keys, the user can move the selection area 106 from cargo option to cargo option and may access other lists of cargo options on the menu. The user may also enter the user's selection, which identifies the cargo and which is received by the controller 14.

Another type of input/output device 128 is shown in FIG. 5. The device 128 in FIG. 5 receives input by touch, so the user 122 can make a selection and identify the cargo simply by touching the screen 120. As shown by FIG. 5, a cargo option can be presented in the form of written words or graphics or any combination thereof. The menu on display screen 120 includes not only written word representations of the cargo 126, but also graphical representations such as icons 124. Graphical representations may also be provided in other forms, such as animations or photographs. Audio representations may be made as well. As used herein, the term "media representations" includes all forms of communication by which the cargo options may be presented other than written word representations, such as audio representations, icons, photographs or any other graphical representations. Media representations assist the user 122 in making a selection. The system 8 may be configured to present any media representations, alone or in combination with written word representations, or in combination with other media representations.

In addition to the input/output devices illustrated in FIGS. 4 and 5, other forms of input/output devices may be used as well. For example, a user in an office 40 can employ a personal computer to identify the cargo, with the computer's display being used to show the menu and the computer's keyboard or mouse used to enter the cargo identification. Other input/output devices may present a menu by means other than by written word or graphical representation, such as audibly or by Braille.

The system 8 may be customized for individual carriers. Although a default menu and a default list of cargo products with default environment-control parameters may be provided with the control unit 12, each individual company can customize the system to its particular needs. For example, some companies haul very few kinds of environment-controlled cargo. Those carriers may prefer an abbreviated on-board database 18. Some carriers compartmentalize their transport units, creating one compartment for one type of cargo (such as frozen food) and another compartment for another type of cargo (such as produce), and controlling the environment in each compartment independently. In such cases a single control unit 12 can be adapted to regulate multiple refrigeration systems severing multiple compartments. Because carriers operate in different climates or at different altitudes, the system 8 may be programmed to take factors such as geographical area or intended route into consideration, and the system may be configured to prompt the user to supply such geographical information. Other companies may prefer to prompt the user to input data pertaining to security, safety or quality, such as a password or identification code or an acknowledgement from the driver that the correct cargo has been loaded.

A number of embodiments of the invention have been described. These and other embodiments are within the scope of the following claims.

What is claimed is:

1. A method comprising:
   providing a controller coupled to an environment-adjusting system;
   providing a database communicatively connected to the controller;
   receiving into the database a cargo identification;
   retrieving from the database an environment-control parameter as a function of the identified cargo; and
   regulating the environment-adjusting system with the controller to adjust an environment of a conditioned space of an environment-controlled transport unit based upon the environment-control parameter communicated from the database to the controller.

2. The method of claim 1 further comprising presenting to a user a menu of cargo options.

3. The method of claim 2, wherein the menu of cargo options includes media representations.

4. The method of claim 1, wherein the environment-control parameter is at least one of temperature set point, temperature range, time-out-of-range, optimum mode of operation, humidity, lighting conditions, atmospheric conditions and defrosting constraints.

5. The method of claim 1 further comprising presenting a user the option to set the parameter manually.

6. The method of claim 1, wherein the environment-control parameter is a temperature set point.

7. An article comprising a computer-readable medium which stores computer-executable instructions for controlling an environment of a conditioned space in an environment-controlled transport unit for transporting cargo, the instructions causing a machine to:
   receive into a database a cargo identification;
   retrieve from the database an environment-control parameter as a function of the identified cargo; and
   regulate an environment-adjusting system with a controller to adjust an environment of a conditioned space of an environment-controlled transport unit based upon the environment-control parameter communicated from the database to the controller.

8. The article of claim 7, the instructions further causing a machine to present to a user a menu of cargo options.

9. The article of claim 8, wherein the menu of cargo options includes media representations.

10. The article of claim 7, wherein the environment-control parameter is at least one of temperature set point, temperature range, time-out-of-range, optimum mode of operation, humidity, lighting conditions, atmospheric conditions and defrosting constraints.

11. The article of claim 7, the instructions further causing a machine to present a user an option to set the parameter manually.

12. The article of claim 7, wherein the environment-control parameter is a temperature set point.

13. An environment control system comprising:
   an environment-adjusting system configured to adjust the environment of a conditioned space;
   a controller coupled to the environment-adjusting system and configured to regulate the environment-adjusting system;
   a database communicatively connected to the controller, wherein the database comprises a cargo identification and an environment-control parameter as a function of the cargo identification; and
   an input device coupled to the controller;
   wherein the controller is configured upon selection of a cargo identification by way of the input device to retrieve the environment-control parameter as a function of the cargo identification from the database and to regulate the environment-adjusting system based upon the environment-control parameter.

14. The system of claim 13, wherein the input device includes at lease one of a keypad, a touch screen, a keyboard, a mouse and a personal computer.

15. The system of claim 13, further comprising an output device.

16. The system of claim 15, wherein the output device includes at least one of a display screen, a touch screen, and a personal computer.

17. The system of claim 16, wherein the output device is configured to display alphanumeric and graphic data.

18. The system of claim 13, further comprising a sensor coupled to the controller.

19. The system of claim 13 further comprising an external communication interface.

20. The system of claim 19, wherein the external communication interface is configured to establish a communication connection by radio frequency signal, infrared signal, satellite link or cellular telephone.

21. The system of claim 13, wherein the database comprises a plurality of cargo identifications and a plurality of environment-control parameters as a function of each cargo identification in the database.

22. The system of claim 13, wherein the environment-adjusting system includes at least one of a refrigeration system, humidifier, lighting system, dehumidifier, atmosphere regulator and venting system.

23. The system of claim 13 further comprising memory coupled to the controller, wherein the database resides in the memory.

24. The system of claim 13, wherein the environment-control parameter is a temperature set point.

25. An environment-controlled transport unit comprising:
   a container defining a conditioned space; and
   an environment control system configured to receive into a database a cargo identification and to retrieve from the database an environment-control parameter as a function of the cargo identification;
   wherein the environment control system is configured to regulate an environment adjusting system with a controller to adjust an environment of the conditioned space based upon the environment-control parameter communicated from the database to the controller.

26. The environment-controlled transport unit of claim 25, wherein the environment-control parameter is a temperature set point.

* * * * *